US 10,498,415 B2

(12) United States Patent
Parker et al.

(10) Patent No.: US 10,498,415 B2
(45) Date of Patent: Dec. 3, 2019

(54) SYSTEMS AND METHODS FOR A MULTI-MODE ACTIVE ELECTRONICALLY SCANNED ARRAY

(71) Applicant: Raytheon Company, Waltham, MA (US)

(72) Inventors: Samuel E. Parker, Lakewood, CA (US); Scott E. Adcook, Irvine, CA (US)

(73) Assignee: Raytheon Company, Waltham, MA (US)

( * ) Notice: Subject to any disclaimer, the term of this patent is extended or adjusted under 35 U.S.C. 154(b) by 72 days.

(21) Appl. No.: 15/384,479

(22) Filed: Dec. 20, 2016

(65) Prior Publication Data

US 2018/0175920 A1 Jun. 21, 2018

(51) Int. Cl.
*H04B 7/06* (2006.01)
*H04W 16/28* (2009.01)
(Continued)

(52) U.S. Cl.
CPC ............. *H04B 7/0602* (2013.01); *H01Q 3/26* (2013.01); *H01Q 21/06* (2013.01); *H04B 1/48* (2013.01);
(Continued)

(58) Field of Classification Search
None
See application file for complete search history.

(56) References Cited

U.S. PATENT DOCUMENTS

| 5,881,369 A | 3/1999 | Dean et al. |
| 8,369,250 B1 * | 2/2013 | Khlat ................... H04B 1/0057 370/280 |

(Continued)

FOREIGN PATENT DOCUMENTS

| JP | 2002368725 A | 12/2002 |
| KR | 20080031552 A | 4/2008 |

OTHER PUBLICATIONS

Doane, et al.; "Simultaneous Transmit and Receive with Digital Phased Arrays;" 2016 IEEE International Symposium on Phased Array System & Technology; Oct. 18-21, 2016; 6 pages.
(Continued)

*Primary Examiner* — Adnan Baig
(74) *Attorney, Agent, or Firm* — Daly, Crowley, Mofford & Durkee, LLP

(57) ABSTRACT

Systems and methods described herein are directed towards an active electronically scanned array (AESA) that can perform both frequency division duplexing (FDD) operations and time division duplexing (TDD) operations. The AESA includes a switch network having one or more switching stages coupled between a transceiver and one or more array elements to switch the AESA between FDD operation and TDD operations, modify a function of one or more of the array elements in the AESA and/or swap portions of the AESA between different functions. The switch network can be disposed in a feed portion of the AESA. Thus, functions of each of the array elements or subarrays of multiple array elements in the AESA can be modified at a feed portion of the AESA. The array elements can be configured for TDD operations and FDD operations and can be configured as a transmit elements, receive elements or isolation elements.

16 Claims, 10 Drawing Sheets

(51) Int. Cl.
*H01Q 3/26* (2006.01)
*H01Q 21/06* (2006.01)
*H04B 1/48* (2006.01)
*H04B 7/26* (2006.01)
*H04L 5/14* (2006.01)

(52) U.S. Cl.
CPC ......... *H04B 7/0691* (2013.01); *H04B 7/2643* (2013.01); *H04W 16/28* (2013.01); *H04L 5/143* (2013.01); *H04L 5/1469* (2013.01)

(56) References Cited

U.S. PATENT DOCUMENTS

| | | | |
|---|---|---|---|
| 8,467,363 B2 | 6/2013 | Lea et al. | |
| 2002/0016183 A1 | 2/2002 | Lehtinen | |
| 2008/0136736 A1* | 6/2008 | Proctor | H01Q 1/007 343/893 |
| 2008/0198776 A1* | 8/2008 | Seo | H04B 1/48 370/280 |
| 2009/0009421 A1* | 1/2009 | Suprunov | H01Q 1/08 343/881 |
| 2009/0302845 A1* | 12/2009 | Biber | G01R 33/3415 324/318 |
| 2012/0112851 A1* | 5/2012 | Manssen | H03H 7/40 333/101 |
| 2015/0048977 A1* | 2/2015 | Khandani | H01Q 3/46 342/385 |

OTHER PUBLICATIONS

Snow, et al.; "Concurrent Multifunction Transmit and Receive Applications with Dynamic Filtering;" 2010 IEEE International Symposium on Phased Array Systems and Technology (ARRAY); Oct. 12-15, 2010; 6 pages.

Ma Xin; "Multi-Antenna Technology;" Antenna Co-Site Solutions; DGMN Alliance; Aug. 31, 2012; 33 pages.

* cited by examiner

SYSTEMS AND METHODS FOR A MULTI-MODE ACTIVE ELECTRONICALLY SCANNED ARRAY

BACKGROUND

As is known in the art, frequency division duplexing (FDD) systems typically use narrow-band diplexers or multiplexers to perform transmit and receive operations simultaneously and at separate frequencies through a single antenna. Time division duplexing (TDD) systems alternate between transmitting and receiving at separate times and at the same frequency through the same antenna. In order for an agile wideband tuner to support a broad range of both FDD and TDD communication protocols and channels, a collection of separate narrowband filters, diplexers, and antennas must be used.

SUMMARY

Systems and methods described herein are directed towards an active electronically scanned array (AESA) that can perform both frequency division duplexing (FDD) operations and time division duplexing (TDD) operations. The AESA includes a switch network having one or more switching stages coupled between a transceiver and one or more array elements to switch the AESA between FDD operation and TDD operations, modify a function of one or more of the array elements in the AESA and/or swap portions of the AESA between different functions. In an embodiment, the switch network can be disposed in a feed portion of the AESA. Thus, functions of each of the array elements or subarrays of multiple array elements in the AESA can be modified at the feed portion of the AESA, in contrast to at the individual array element level.

For example, the array elements can be configured to perform transmit functions, receive functions, or isolation functions by changing one or more couplings in the switch network of the AESA. A function of each of the array elements can be changed to accommodate a particular application of the AESA. Thus, each of the array elements can be configured as transmit array elements, receive array elements or isolation array elements within the same AESA by modifying couplings in the feed portion. It should be appreciated that the feed portion as used herein can refer to the components between the transceiver and the array elements in the AESA.

The switch network can include one or more mode-switching stages, a filter switching stage, and a crossover switching stage. The mode-switching stages include a plurality of radio frequency (RF) switches and can modify one or more signal paths within the AESA to change a mode of operation of the AESA between FDD operations and TDD operations. In some embodiments, the mode-switching stages can be disposed on both sides of the filter switching stage. The filter switching stage can include one or more filter banks to filter signals being transmitted through signal paths within the AESA.

The crossover switching stage can swap portions of the array elements between different functions. For example, the array elements can be swapped between transmit functions and receive functions to improve isolation over wide beam steering angles. In some embodiments, a leakage factor can be reduced by swapping the array elements between different functions. The crossover switching stage can include a plurality of RF switches arranged such that the RF switches can swap signal paths within the AESA to configure and swap the array elements between transmit functions, receive functions, or isolation functions. Thus, the AESA can provide for flexible allocation of transmit, receive and/or isolation array elements within a single array.

Each of the array elements can be part of or be coupled to a unit cell. The unit cell can be configured to control phase and/or amplitude properties of signals received at or transmitted from a respective array element. The unit cell can include one or more RF switches to connect or disconnect a feed port and/or an antenna port of the respective array element from a signal path within the AESA. Thus, the unit cell can be configured to modify the respective array element from an active element to a passive element and vice versa and change a function of the respective array element.

In some embodiments, in TDD mode, each of the array elements in the AESA can be configured for transmit functions or receive functions to provide maximum available gain. In FDD mode, the array elements can be formed into multiple subarrays to perform transmit functions, receive functions, isolation functions, or a combination of them. Each of the subarrays can be moved or resized to balance array performance including gain, effective isotropic radiated power (EIRP) and isolation. In some embodiments, the subarray functions can be swapped from one side of the array to the other side of the array to maximize isolation over all beam steering angles.

In a first aspect, an AESA comprises a plurality of array elements, each of the plurality of array elements configured for TDD operations and FDD operations and a switch network coupled to the plurality of array elements. The switch network includes a plurality of stages to switch one or more of the plurality of array elements between a TDD mode and a FDD mode. The switching network includes a first and second mode-switching stage and a crossover switching stage.

In some embodiments, the switch network comprises a filter bank switching stage disposed on a signal path between the first mode-switching stage and the second mode-switching stage. Each of the plurality of array elements can be configured to operate as at least one of a transmit element, a receive element or an isolation element. For example, in TDD mode, each of the plurality of array elements can be configured to operate as transmit or receive elements. In FDD mode, a first portion of the plurality of array elements can be configured to operate as transmit elements, a second portion of the plurality of array elements can be configured to operate as receive elements and a third portion of the plurality of array elements can be configured to operate as isolation elements. The switch network can be coupled to the plurality of array elements such that the isolation elements are disposed between the transmit elements and the receive elements.

The first and second mode-switching stages include one or more radio frequency (RF) switches disposed on at least two signal paths through the AESA. The filter bank switching stage can include a FDD transmit filter bank, a FDD receive filter bank and a TDD filter bank coupled to the one or more RF switches in the first and second mode stages. The crossover switch stage can include two or more radio frequency (RF) switches arranged such that two signal paths through the AESA crisscross.

Each of the plurality of array elements can include a feed port, an antenna port, one or more amplitude units, one or more phase units, and one or more load units. The feed port and the antenna port can be coupled to the one or more load units to convert the respective array element into an isolation element.

In another aspect, a method for switching an AESA between TDD mode and FDD is provided. The method comprises providing a plurality of array elements, each of the plurality of array elements configured for TDD operations and FDD operations, switching the plurality of array elements between a TDD mode and a FDD mode and converting one or more of the plurality of array elements to at least one of a transmit element, a receive element or an isolation element responsive to switching to the TDD mode or FDD mode.

A switch network having a plurality of stages to switch the plurality of array elements between the TDD mode and the FDD mode can be provided. The switch network can include a first and second mode-switching stage, a crossover switching stage, and a filter bank switching stage.

The method can further comprise converting each of the plurality of array elements configured to operate as transmit or receive elements in the TDD mode. In FDD mode, the method can further comprise converting a first portion of the plurality of array elements configured to operate as transmit elements, a second portion of the plurality of array elements configured to operate as receive elements and a third portion of the plurality of array elements configured to operate as isolation elements. The plurality of array elements can be converted such that the isolation elements are disposed between the transmit elements and the receive elements.

In some embodiments, couplings within the first and second mode stages can be modified to change the plurality of array elements from TDD operations to FDD operations and from FDD operations to TDD operations. Couplings can be modified within the crossover switching stage to convert a first grouping of the plurality of array elements from transmit elements to receive elements and convert a second grouping of the plurality of array elements from receive elements to transmit elements.

Each of the plurality of array elements comprises a feed port, an antenna port, one or more amplitude units, one or more phase units, and one or more load units. The method can further comprise coupling the feed port and the antenna port to the one or more load units to convert the respective array element into the isolation element.

BRIEF DESCRIPTION OF THE DRAWINGS

The foregoing features may be more fully understood from the following description of the drawings in which.

DETAILED DESCRIPTION

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

Figure 1:
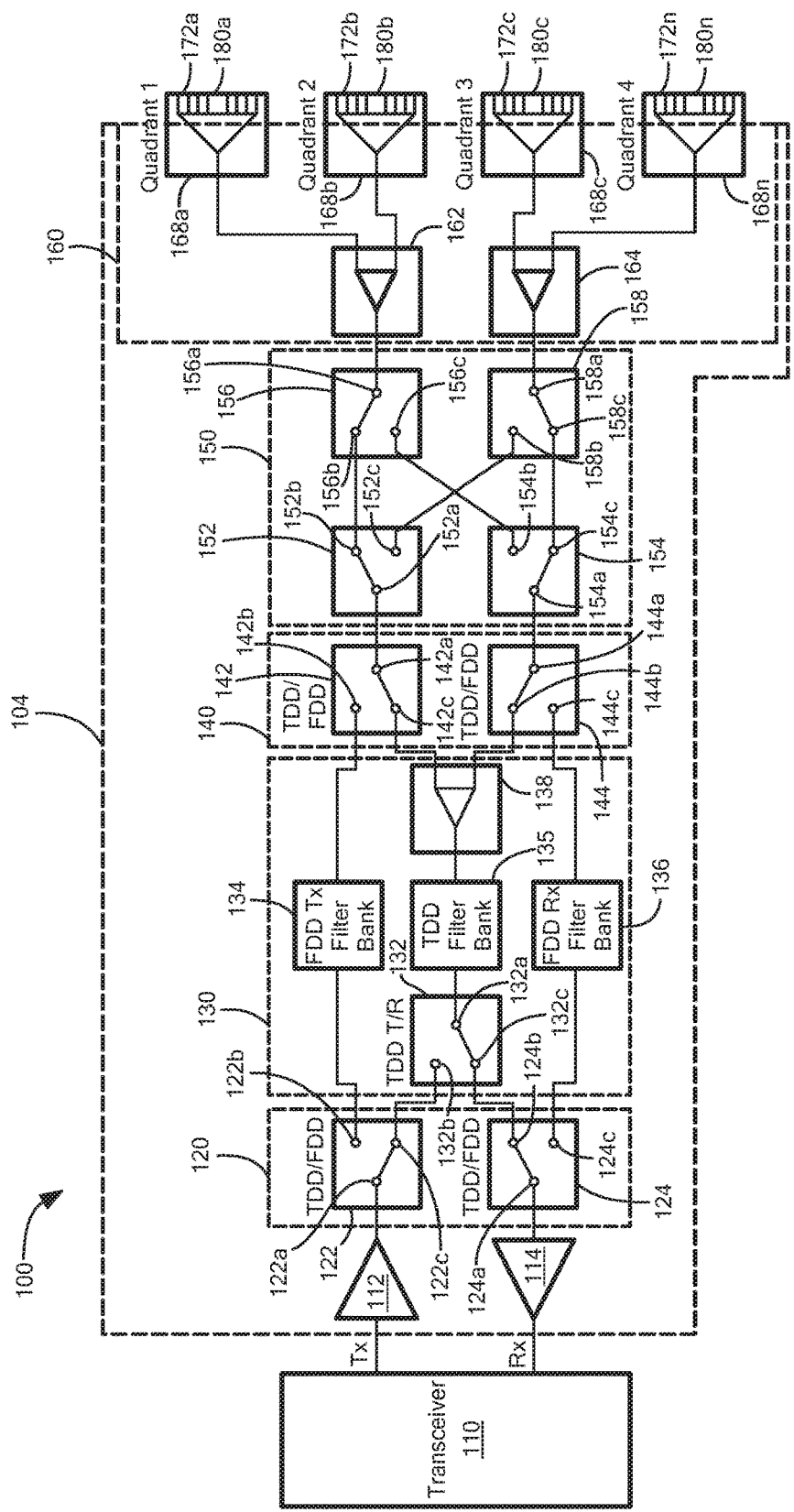
FIG. 1 is a block diagram of circuitry of an active electronically scanned array (AESA)

Now referring to FIG. 1, an active electronically scanned array (AESA) 100 includes a switch network 104 having a plurality of switching stages coupled between a transceiver 110 and a plurality of array elements 180a-180n to switch the AESA between time division duplexing (TDD) and frequency division duplexing (FDD) operations over a large bandwidth. For example, in some embodiments, the AESA can switch between TDD and FDD operations over multiple octaves. In some embodiments, the components between transceiver 110 and array element 180a-180n may be referred to herein as a feed portion.

As illustrated in FIG. 1, transceiver 110 is coupled to one or more amplifiers 112, 114. In some embodiments, a first amplifier 112 can be configured for transmit operations and a second amplifier 114 can be configured to receive operations. It should be appreciated, that in some embodiments, AESA 100 may not include amplifiers 112, 114. In other embodiments, AESA 100 may include a single amplifier coupled between transceiver 110 and a first mode-switching stage 120.

Amplifiers 112, 114 are coupled to at least one radio frequency (RF) switch 122, 124 in first mode-switching stage 120. First amplifier 112 is coupled to a first RF switch 122 and second amplifier 114 is coupled to a second RF switch 124. First and second RF switches 122, 124 can be configured to form a first part (with a second mode-switching stage 140) of a mode-switching arrangement to switch AESA 100 between TDD mode and FDD mode and vice versa, as will be discussed in greater detail with respect to FIG. 2.

First and second RF switches 122, 124 can be coupled to a third RF switch 132 or one of a plurality of filters 134, 135, 136 in filter switching stage 130. For example, in TDD mode, each of first and second amplifiers 122, 124 can be coupled to third RF switch 132. Third RF switch 132 can be coupled to a third filter 135 or one of a plurality of filters. Third filter 135 can be configured to filter signals for TDD mode. Third filter 135 can be coupled to a splitter-combiner circuit 138 configured, for transmit operations, to divide an output from third filter 135 into two or more signals to provide the two or more signals to RF switches 142, 144 in second mode-switching stage 140. Alternatively, for receive operations, splitter-combiner circuit 138 can be configured to combine signals from second mode-switching stage 140 and provide them to third filter 135.

In FDD mode, first RF switch 122 can be coupled to a first filter 134 and second RF switch 124 can be coupled to a second filter 136. In an embodiment, first filter 134 can be configured to be a transmit filter and second filter 136 can be configured to be a receive filter. For example, in FDD mode, first RF switch 122 can establish a signal path for transmit functions through first filter 134 and second RF switch 124 can establish a signal path for receive functions through second filter 136. It should be appreciated that in some embodiments, the transmit and receive paths can be swapped based at least in part on an arrangement of a crossover switching stage 150 and/or splitter-combiner stage 160, as will be discussed in greater detail below with respect to FIG. 2.

Still referring to FDD mode, first and second filters 134, 136 can be coupled to RF switches 142, 144 in second mode-switching stage 140. For example, first filter 134 can be coupled to a fourth RF switch 142 and second filter 136 can be coupled to a fifth RF switch 144. As indicated above, splitter-combiner circuit 138 can be coupled to both fourth and fifth RF switches 142, 144 in TDD mode.

In both TDD and FDD mode, second mode-switching stage 140 is coupled to crossover switching stage 150. For example, fourth RF switch 142 is coupled to a sixth RF switch 152 and fifth RF switch 144 is coupled to a seventh RF switch 154.

Crossover switching stage 150 can be configured to swap a portion of array elements 180a-180n from one function to another function and thus swap one or more signal paths within AESA 100 from one function to a second, different function. For example, crossover switching stage 150 can be configured to swap a first portion of array elements 180a-180n from performing transmit functions to receive functions and/or swap a second, different, portion of array elements 180a-180n from receive functions to transmit functions. Crossover switching stage 150 includes a plurality of RF switches 152, 154, 156, 158 to swap one or more signal paths within AESA 100.

In crossover switching stage 150, sixth RF switch 152 is coupled to eighth RF switch 156 and ninth RF switch 158. Seventh RF switch 154 is coupled to eighth RF switch 156 and ninth RF switch 158. In some embodiments, eighth RF switch 156 and ninth RF switch 158 can be disposed on separate signal paths within AESA 100. Thus, sixth and seventh RF switch 152, 154 can receive from and/or transmit to each of eighth RF switch 156 and ninth RF switches 158 to change the path of signals being received and/or transmitted within AESA 100. Crossover switching stage 150 will be described in greater detail below with respect to FIG. 3.

Crossover switching stage 150 is coupled to splitter-combiner stage 160. Splitter-combiner stage 160 can include one or more splitter-combiner circuits 162, 164, 168a-168n to divide and/or combine signals being transmitted by array elements 180a-180n and/or received at array elements 180a-180n.

For example, eighth RF switch 156 is coupled to a second splitter-combiner circuit 162 and ninth RF switch 158 is coupled to a third splitter-combiner circuit 164. Second splitter-combiner circuit 162 can be configured, for transmit operations, to divide an output from eighth RF switch 156 into two or more signals to provide the two or more signals to one or more splitter-combiner circuits 168a-168n. Alternatively, for receive operations, second splitter-combiner circuit 162 can be configured to combine signals received from one or more splitter-combiner circuits 168a-168n and provide the signals to eight RF switch 156.

Third splitter-combiner circuit 164 can be configured, for transmit operations, to divide an output from ninth RF switch 158 into two or more signals to provide the two or more signals to one or more splitter-combiner circuits 168a-168n. Alternatively, for receive operations, third splitter-combiner circuit 164 can be configured to combine signals received from one or more splitter-combiner circuits 168a-168n and provide the signals to ninth RF switch 158.

For transmit operations, splitter-combiner circuits 168a-168n can divide the signals into two or more signals to provide the two or more signals to one or more subarrays 172a-172n of array elements 180a-180n. For receive operations, each of second and third splitter-combiner circuits 162, 164 can receive signals from one or more splitter-combiner circuits 168a-168n. Splitter-combiner circuits 168a-168n can combine signals received from one or more subarrays 172a-172n of array elements 180a-180n and provide them to second and third splitter-combiner circuits 162, 164.

Array elements 180a-180n can be organized into one or more subarrays 172a-172n. Although FIG. 1 illustrates array elements 180a-180n organized into four subarrays 172a-172n, it should be appreciated that array elements 180a-180n can be organized into any number of subarrays (e.g., two or more subarrays) based at least in part on a particular application of AESA 100.

For example, AESA 100 may include two or more subarrays 172a-172n. In some embodiments AESA 100 may include two subarrays. In other embodiments, AESA 100 may include two or more subarrays 172a-172n. Each subarray 172a-172n may include one or more array elements 180a-180n. In some embodiments, each subarray 172a-172n may include two or more array elements 180a-180n. In one embodiment, each subarray 172a-172n may include a single array element 180. In some embodiments, each subarray 172a-172n may include the same number of array elements 180a-180n. In other embodiments, different subarrays 172a-172n may include a different number of array elements 180a-180n.

In some embodiments, array elements 180a-180n may include a plurality of active elements (e.g., radiating antenna elements) or groups of active elements. In other embodiments, array elements 180a-180n may include a plurality of passive elements or groups of passive elements. In still other embodiments, array elements 180a-180n may include a combination of active and passive elements or groups of elements having a combination of active and passive elements.

It should be appreciated that array elements 180a-180n and thus AESA 100 can be configured for multiple polarizations. For example, array elements 180a-180n and thus AESA 100 can be configured for vertical and/or horizontal polarization. In some embodiments, switch network 104 can be configured to change a polarization of AESA 100. For example, in some embodiments, the elements of AESA 100 can be configured for a first polarization or a second different polarization (e.g., horizontal polarization, vertical polarization) based at least in part on the couplings within switch network 104. In another embodiment, AESA 100 may be duplicated to simultaneously operate with multiple polarizations.

It should be appreciated that each of the couplings between the components of AESA 100 can be configured as outputs and/or inputs. For example, depending on a mode of operation (e.g., transmit operation, receive operation), each of the couplings can be configured to receive signals or to transmit signals to another component in AESA 100.

Figure 1A:
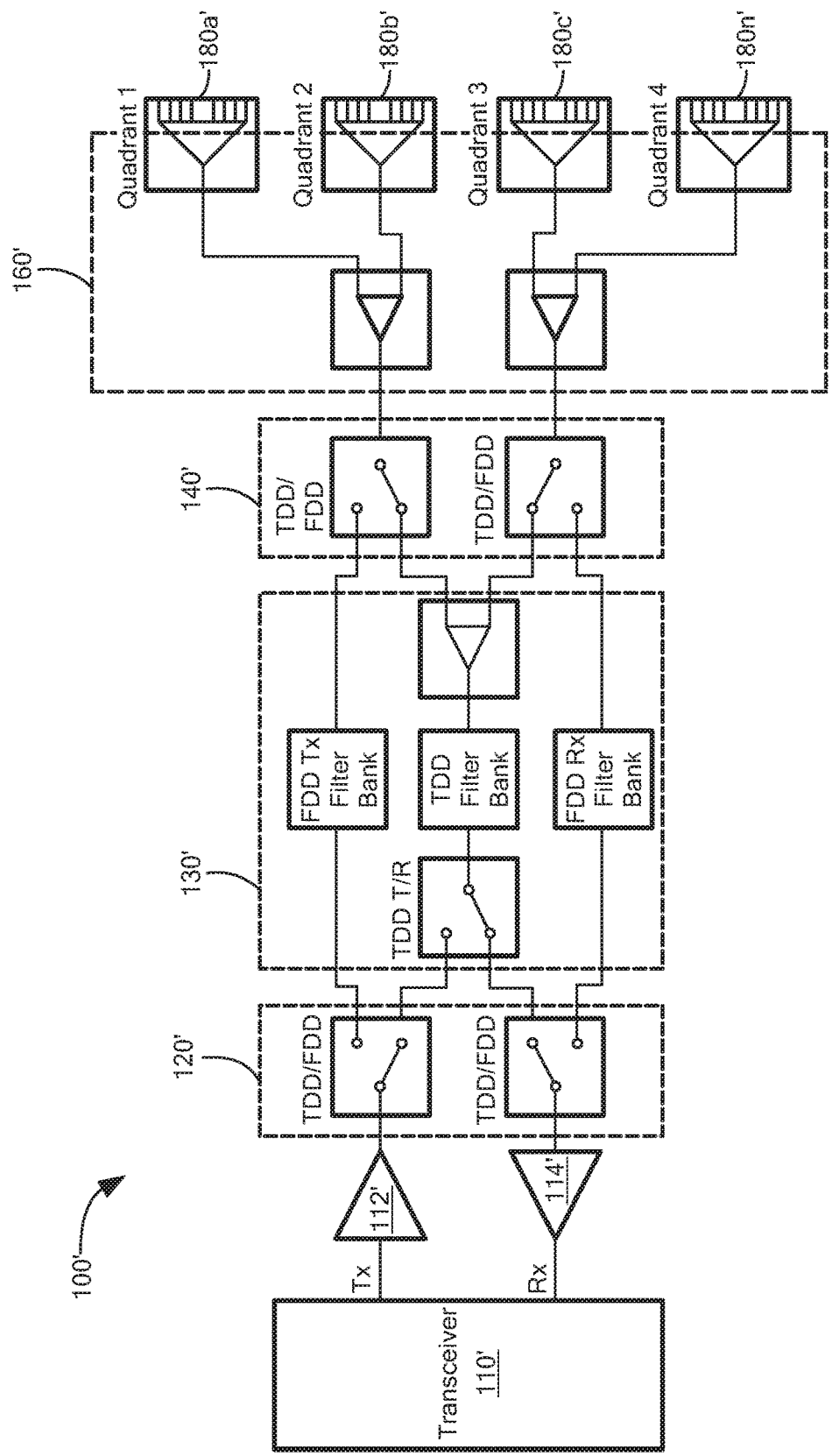
FIG. 1A is a block diagram of circuitry of a second embodiment of an active electronically scanned array (AESA)

In some embodiments, AESA 100 may not include crossover switching stage 150. For example, and briefly referring to FIG. 1A, an AESA 100' includes a transceiver 110' coupled to a first amplifier 112' and a second amplifier 114'. First amplifier 112' and second amplifier 114' can be coupled to a first mode-switching stage 120', first mode-switching stage 120' can be coupled to a filter switching stage 130', filter switching stage 130' can be coupled to a second mode-switching stage 140', second mode-switching stage 140' can be coupled to a splitter-combiner stage 160', splitter-combiner stage 160' can be coupled to array elements 180a-180n'. Each of the components of first mode-switching stage 120', filter switching stage 130', second mode-switching stage 140', and splitter-combiner stage 160', can be the same as or substantially similar to the components of first mode-switching stage 120, filter switching stage 130, second mode-switching stage 140, and splitter-combiner stage 160 of AESA 100 of FIG. 1.

Figure 2:
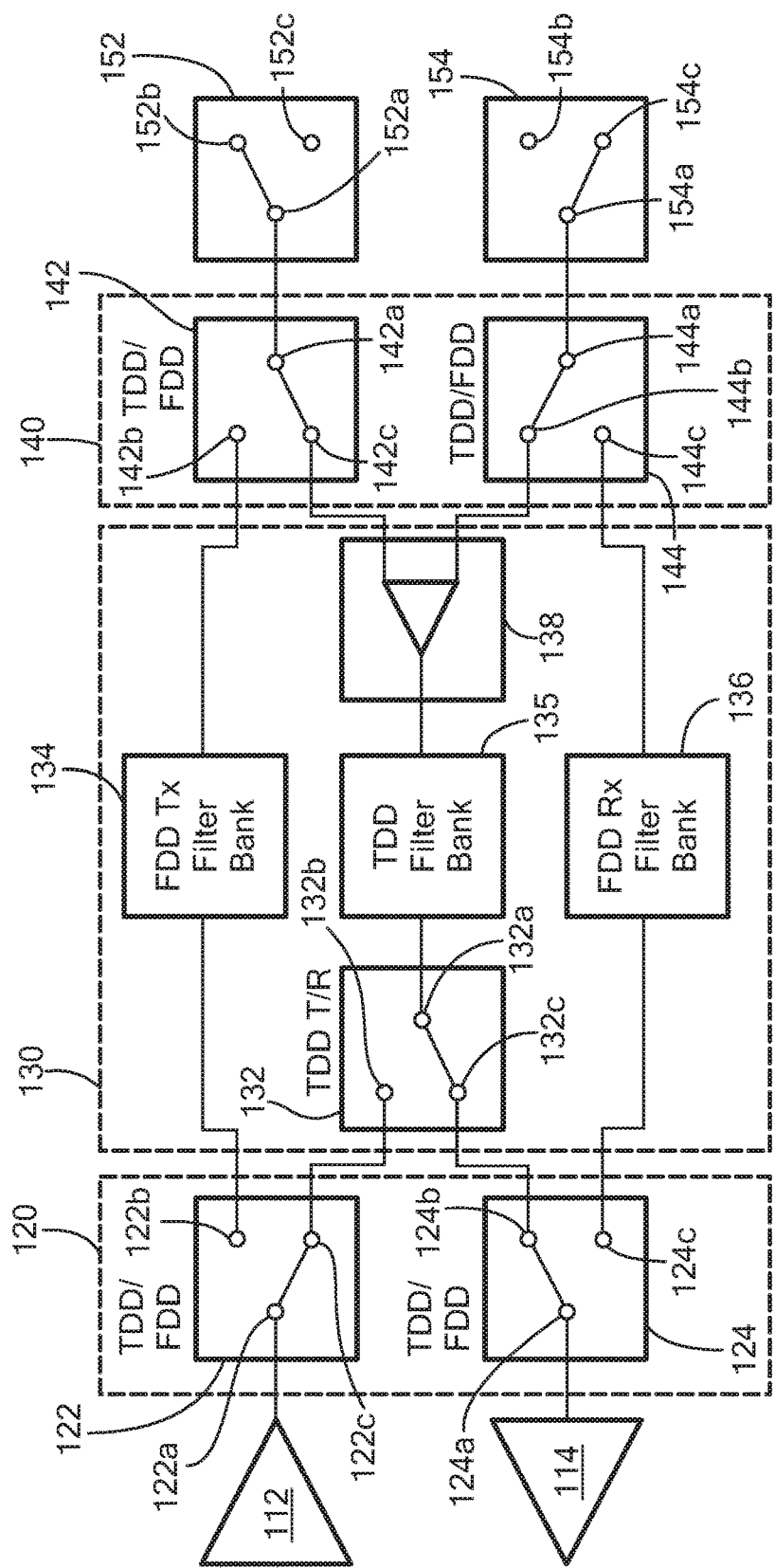
FIG. 2 is a block diagram of a filter switching stage and a first and second mode-switching stage of a switch network of the AESA of FIG. 1.
Figure 3:
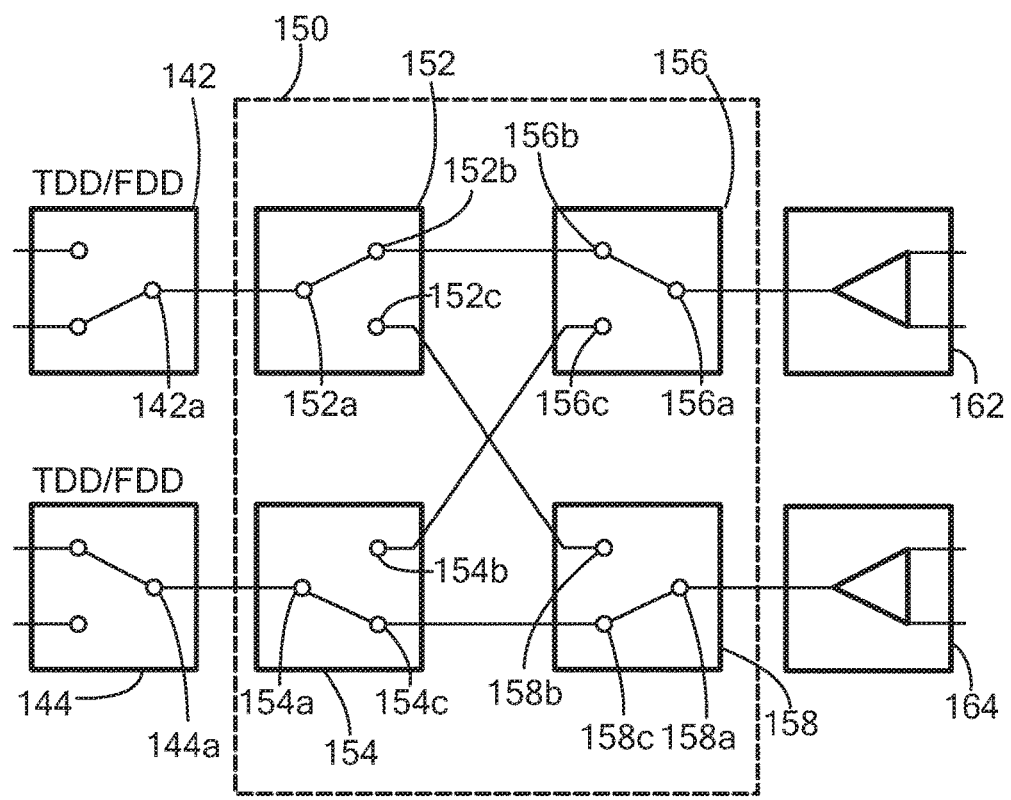
FIG. 3 is a block diagram of a crossover switching of a switch network of the AESA of FIG. 1.
Figure 4:
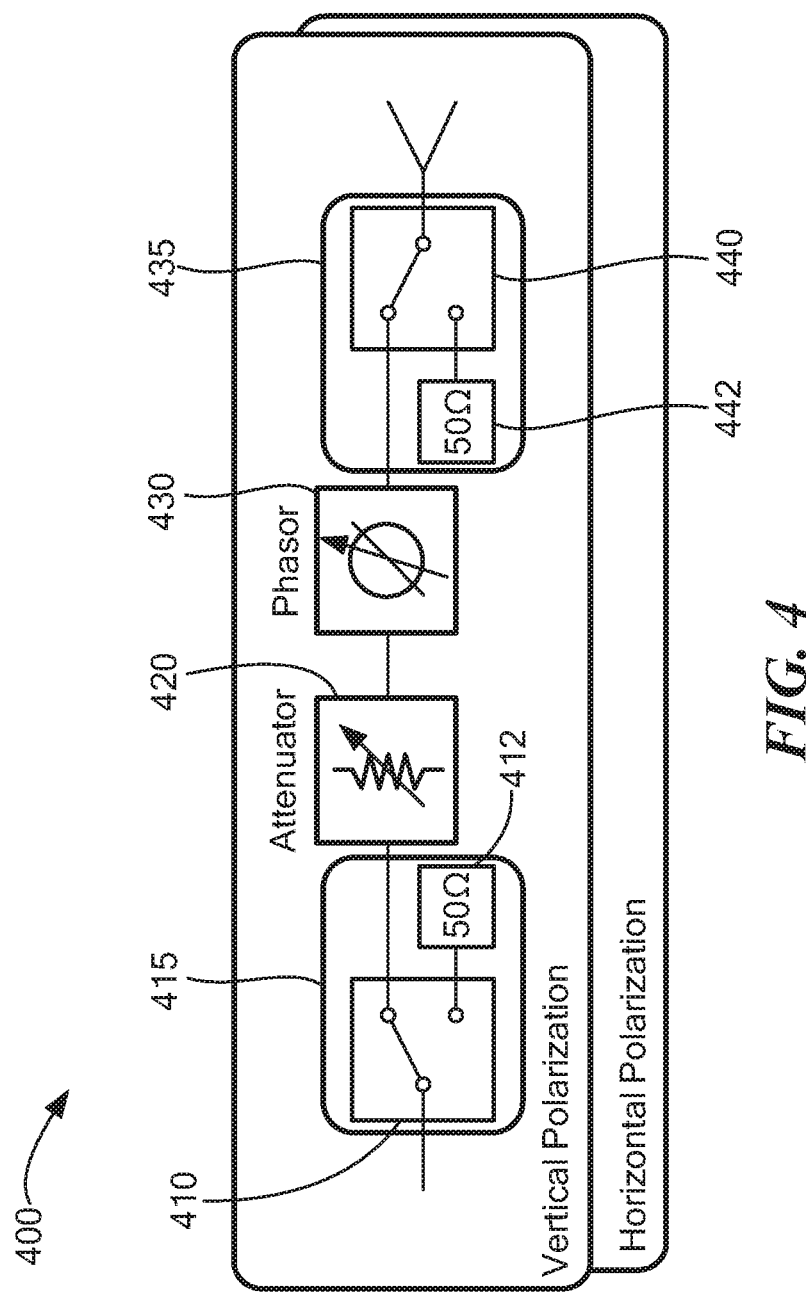
FIG. 4 is a block diagram of a first embodiment of a unit cell of for an array element in the AESA of FIG. 1.

Now referring to FIGS. 2-4, each of the switching stages of AESA 100 are discussed in greater detail, thus like elements are provided having like reference designations as described above with respect to FIG. 1.

Now referring to FIG. 2, filter switching stage 130 and first and second mode-switching stages 120, 140 can be configured to switch AESA 100 between TDD mode and FDD mode and vice versa and thus switch array elements 180a-180n between TDD operations and FDD operations. In some embodiments, filter switching stage 130 and first and second mode-switching stages 120, 140 can be configured to switch array elements 180a-180n between transmit and receive functions and vice versa.

In TDD mode, filter switching stage 130 and first and second mode-switching stages 120, 140 can be configured to switch AESA 100 between transmit and receive functions and thus switch array elements 180a-180n between transmit and receive functions and vice versa. For example, in TDD mode, each of array elements 180a-180n can be configured for TDD operations. However, array elements 180a-180n can be switched between performing transmit and/or receive functions depending on a particular time period. For example, at a first time period, array elements 180a-180n can be configured as transmit array elements for transmit functions in TDD mode and at a second different time period, array elements 180a-180n can be configured as receive array elements for receive functions. Thus, in an embodiment, in TDD mode, the full array of array elements 180a-180n can be used for transmit or receive functions.

In FDD mode, subarrays of array elements 180a-180n can be configured as transmit array elements, receive array elements or isolation array elements. Filter switching stage 130 and first and second mode-switching stages 120, 140 can be coupled such that portions (e.g., subarrays) of array elements 180a-180n are configured for different functions. Thus, in FDD mode, AESA 100 can perform transmit, receive and/or isolation functions simultaneously.

Figure 2A:
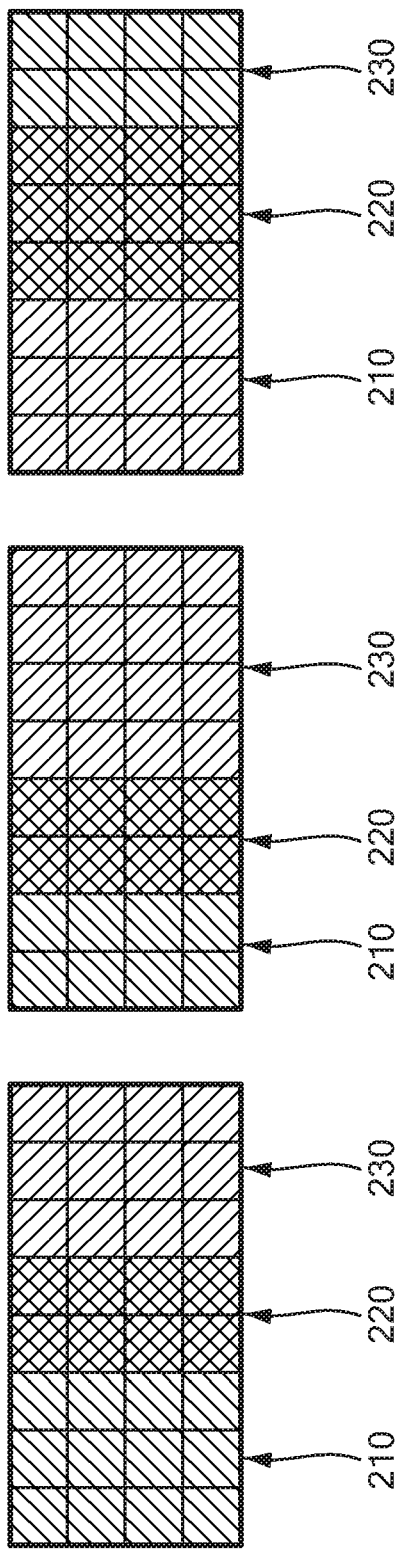
FIG. 2A is a block diagram of subarrays of array elements having different sizes within an AESA.

For example, and briefly referring to FIG. 2A, a first subarray 210 can be configured as transmit array elements, a second subarray 220 can be configured as isolation array elements and a third subarray 230 can be configured as receive array elements.

The subarray size and thus the number of array elements 180a-180n in each of subarrays 210, 220, 230 can be selected, formed and/or resized based at least in part on a particular application of AESA 100. For example, each of subarrays 210, 220, 230 may be the same size and have the same number of array elements 180a-180n. In some embodiments, subarray 210 having transmit array elements may be larger than subarray 220 or subarray 230 to optimize beam transmission characteristics. In other embodiments, subarray 230 having receive array elements may be larger than subarray 210 and/or subarray 220 to optimize receive characteristics. In still other embodiments, subarray 220 having isolation array elements, may be larger than subarray 210 or subarray 230. For example, subarray 220 can be modified to increase or decrease isolation between transmit array elements and receive array elements.

Referring back to FIG. 2, first mode-switching stage 120 includes first and second RF switches 122, 124. Each of first and second RF switches 122, 124 can include multiway switches. For example, in the illustrative embodiment of FIG. 2, each of first and second RF switches 122, 124 can include single pole, two throw (SP2T) switches having three terminals such that a first terminal can couple to either a second or third terminal depending on mode of operation (e.g., TDD, FDD) of AESA 200.

For example, first RF switch 122 can include three terminals such that a second terminal 122b can couple a first terminal 122a to a first filter bank 134 during FDD mode and a third terminal 122c can couple first terminal 122a to a second terminal 132b of third RF switch 132 during TDD mode.

Second RF switch 124 can include three terminals such that a second terminal 124b can couple a first terminal 124a to a third terminal 132c of third RF switch 132 during TDD mode and a third terminal 124c can couple first terminal 124a to a second filter bank 136 during FDD mode.

Third RF switch 132 can be a three-way switch (e.g., a single pole, two throw (SP2T) switch) having three terminals such that a first terminal 132a can couple to either a second terminal 132b or third terminal 132c depending on a desired function (e.g., transmit, receive) of array elements 180a-180n during TDD mode. For example, third RF switch 132 can swap signal paths within AESA 100 to transition array elements 180a-180n between transmit and receive functions during TDD mode. In some embodiments, a first terminal 132a can couple a second terminal 132b to a third filter 135 to configure array elements 180a-180n for transmit functions. To configure array elements 180a-180n for receive functions, first terminal 132a can couple a third terminal 132c to third filter 135.

Third filter 135 can be coupled to a splitter-combiner circuit 138. Splitter-combiner circuit 138, for transmit operations, can be configured to divide an output from third filter 135 into two or more signals to provide the two or more signals to RF switches 142, 144 in second mode-switching stage 140. Alternatively, for receive operations, splitter-combiner circuit 138 can be configured to combine signals from second mode-switching stage 140 and provide them to third filter 135.

Third filter 135 is coupled to splitter-combiner circuit 138 to receive or transmit signals based on a mode of operation. For example, in TDD mode and for transit operations, third filter 135 can transmit signals received from transceiver 110 (via first mode-switching stage 120) to splitter-combiner circuit 138. Splitter-combiner circuit 138 can provide the signals from transceiver 110 to both the fourth and fifth RF switches 142, 144. For receive operations, splitter-combiner circuit 138 can receive signals from one of or both of fourth and fifth RF switches 142, 144 and transmit them to third filter 135.

Second mode-switching stage 140 is coupled to filter switching stage 130. Second mode-switching stage 140 includes fourth and fifth RF switches 142, 144. Fourth and fifth RF switches 142, 144 can include multiway switches, such as a single pole, two throw (SP2T) switches. For example, in the illustrative embodiment of FIG. 2, each of fourth and fifth RF switches 142, 144 can include three-way switches having three terminals such that a first terminal can couple either a second or third terminal to another RF switch in the crossover switching stage 150 depending on mode of operation (e.g., TDD, FDD) of AESA 100.

For example, fourth RF switch 142 can include three terminals such that a first terminal 142a can couple a second terminal 142b to a first terminal 152a of sixth RF switch 152 during FDD mode and first terminal 142a can couple a third terminal 142c to the first terminal 152a of sixth RF switch 152 during TDD mode.

Fifth RF switch 144 can include three terminals such that a first terminal 144a can couple a second terminal 144b to a first terminal 154a of seventh RF switch 154 during TDD mode and first terminal 144a can couple a third terminal 144c to first terminal 154a of seventh RF switch 154 during FDD mode.

Figure 2B:
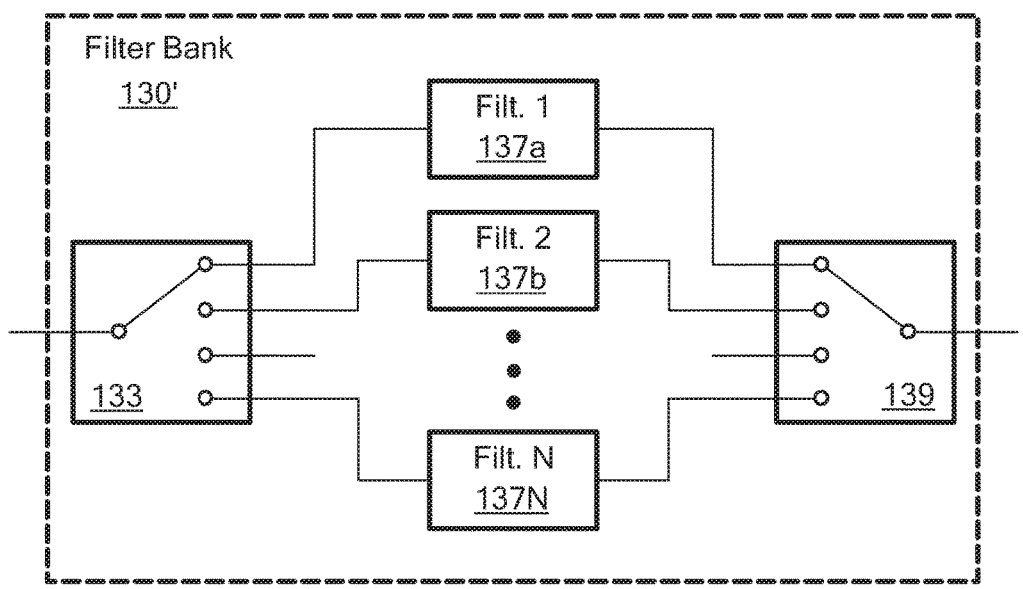
FIG. 2B is a block diagram of a filter switching stage of the AESA of FIG. 1 having a plurality of filters.

It should be appreciated that in some embodiments, filters 134, 135, and/or 136 may each be comprised of a plurality of filters. For example, and briefly referring to FIG. 2B, in some embodiments, a filter 130' may include a plurality of filters 137a-137n (e.g., a bank of filters) disposed between two RF switches 133, 139. For example, filters 137a-137n may include a bank of filters disposed in parallel with RF switches 133, 139. RF switches 133, 139 can include multiway switches, such as a single pole, multi-throw switch (SPMT). Each of RF switches 133, 139 can include a first terminal that can couple to one of a plurality of other terminals (N terminals) to couple the respective RF switch to at least one filter of filters 137a-137n. In some embodiments, filters 137a-137n may include one or more tunable filters.

Now referring to FIG. 3, crossover switching stage 150 includes a plurality of RF switches to switch one or more sub-arrays of array elements 180a-180n between transmit and/or receive operations. The sub-arrays can be swapped between different functions to reduce coupling and reduce a leakage factor. In some embodiments, crossover switching stage 150 can provide greater flexibility and allow for isolation to be optimized over all beam steering angles.

Figure 3A:
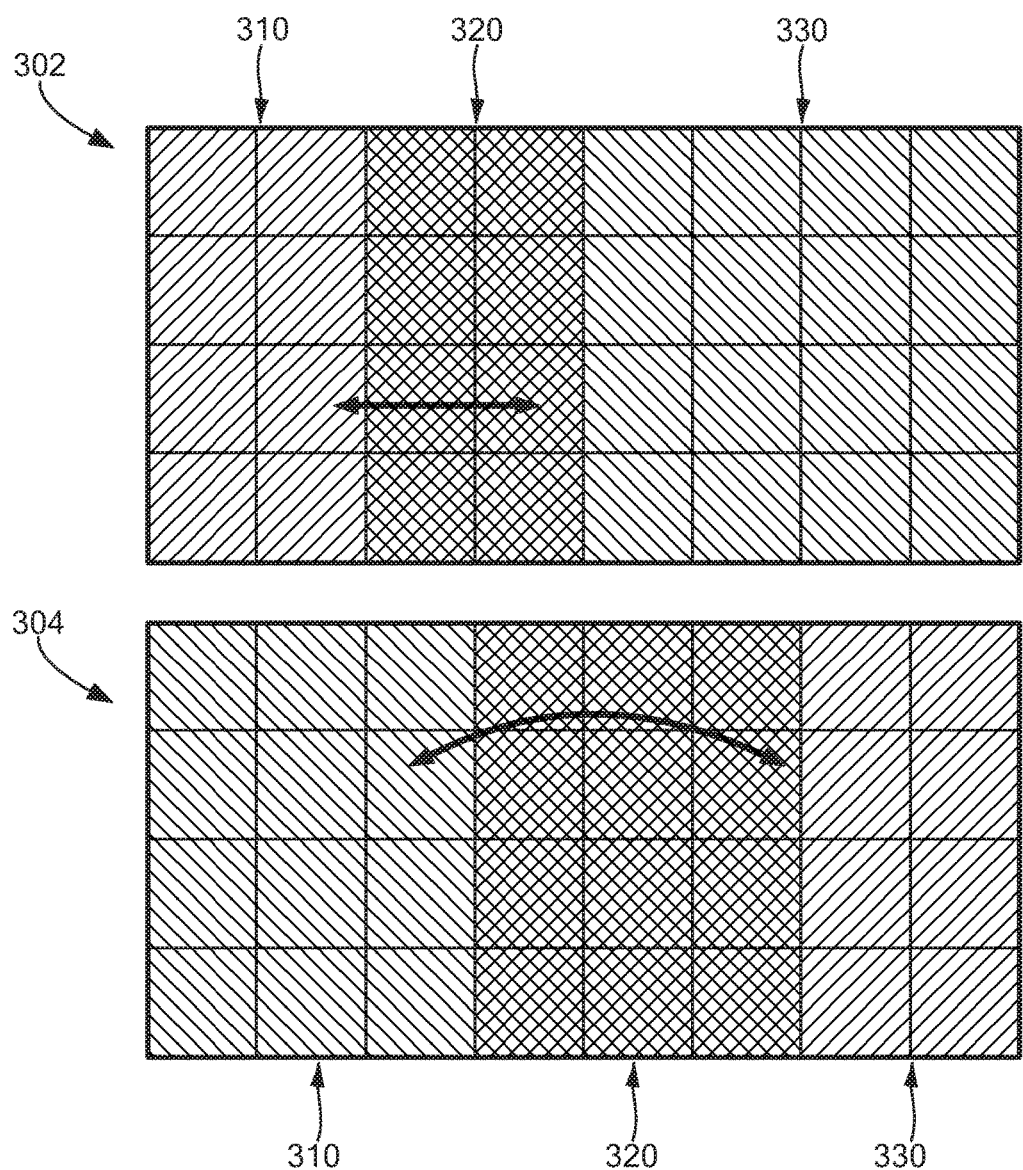
FIG. 3A is a block diagram illustrating subarrays of array elements being swapped within an AESA.

For example, and briefly referring to FIG. 3A, a first AESA configuration 302 can include a first subarray 310 having transmit array elements, a second subarray 320 having isolation array elements and a third subarray 330 having receive array elements. In an embodiment, coupling arrangements in one or more of the RF switches in crossover switching stage 150 can be modified to swap first subarray 310 and third subarray 330 to form a second AESA configuration 304. For example, as the beam generated by the respective AESA steers from one side to another side, the subarrays 310, 320, 330 may be swapped to improve isolation between the transmit array elements and receive array elements and/or to reduce a leakage factor that may occur at large beam steering angles.

In some embodiments, portions of subarrays 310, 320, 330 may be swapped to resize the respective subarrays. For example, a portion of subarray 320 may be swapped to subarray 310 and/or subarray 330 to decrease the size of subarray 320. In other embodiments, a portion of subarray 310 and/or subarray 330 may be swapped to subarray 320 to increase a size of subarray 320. In some embodiments, the subarrays can be swapped during active operation of the respective AESA.

Referring back to FIG. 3, crossover switching stage 150 includes a sixth RF switch 152, seventh RF switch 154, eighth RF switch 156 and ninth RF switch 158. Each of the RF switches 152, 154, 156, 158 can include multiway switches. For example, in the illustrative embodiment of FIG. 3, each of the RF switches 152, 154, 156, 158 can include three-way switches having three terminals, such as a single pole, two throw (SP2T) switch. The terminals of each of RF switches 152, 154, 156, 158 can be coupled such that signal paths crisscross between them.

For example, sixth RF switch 152 includes three terminals. In some embodiments, the terminals can be coupled such that a first terminal 152a is coupled to fourth RF switch 142 in the second mode-switching stage 140, a second terminal 152b is coupled to eighth RF switch 156 and a third terminal 152c is coupled to ninth RF switch 158. Sixth RF switch 152 can be configured to swap between a connection between eighth and ninth RF switches 156, 158 to swap one or more subarrays 172a-172n of array elements 180a-180n between transmit and receive operations, depending on a position of first terminal 152a. For example, when first terminal 152a is coupled to second terminal 152b, sixth RF switch 152 is coupled to eighth RF switch 156 to transmit or receive signals. When first terminal 152a is coupled to third terminal 152c, sixth RF switch 152 is coupled to ninth RF switch 158 to transmit or receive signals. Thus, depending on whether first terminal 152a is coupled to second terminal 152b or third terminal 152c, sixth RF switch 152 can be configured to transmit or receive signals from either eighth RF switch 156 or ninth RF switch 158.

Seventh RF switch 154 includes three terminals. In some embodiments, the terminals can be coupled such that a first terminal 154a is coupled to fifth RF switch 144 in the second mode-switching stage 140, a second terminal 154b is coupled to eighth RF switch 156 and a third terminal 154c is coupled to ninth RF switch 158. Seventh RF switch 154 can be configured to swap between a connection between eighth and ninth RF switches 156, 158 to swap one or more subarrays 172a-172n of array elements 180a-180n between transmit and receive operations, depending on a position of first terminal 154a. For example, when first terminal 154a is coupled to second terminal 154b, seventh RF switch 154 is coupled to eighth RF switch 156 to transmit or receive signals. When first terminal 154a is coupled to third terminal 154c, seventh RF switch 154 is coupled to ninth RF switch 158 to transmit or receive signals. Thus, depending on whether first terminal 154a is coupled to second terminal 154b or third terminal 154c, seventh RF switch 154 can be configured to transmit or receive signals from either eighth RF switch 156 or ninth RF switch 158.

Eighth RF switch 156 is coupled to a second splitter-combiner circuit 162 and ninth RF switch 164 is coupled to a third splitter-combiner circuit 164. For transmit operations, eighth RF switch 156 and ninth RF switch 158 can transmit signals to second splitter-combiner circuit 162 and third splitter-combiner circuit 164 respectively. For receive operations, eighth RF switch 156 and ninth RF switch 158 can receive signals to second splitter-combiner circuit 162 and third splitter-combiner circuit 164 respectively.

Now referring to FIG. 4, an array element 480 can be part of a unit cell 400. The unit cell 400 can include a signal path 402 having a feed port 415 coupled to an attenuator 420, the attenuator 420 coupled to a phasor 430, the phasor 430 coupled to an antenna port 435 and the antenna port 435 coupled to an array element 480. It should be appreciated that array element 480 may be the same as or substantially similar to array elements 180a-180n described above with respect to FIGS. 1-3. Thus, each of array elements 180a-180n may be coupled to or include a unit cell such as unit cell 400 to perform the same functions as will be described below.

The feed port 415 and antenna port 435 can include components to control operation and/or change a function of the respective array element 480 between transmit operations, receive operations or isolation operations. For example, and in the illustrative embodiment of FIG. 4, feed port 415 includes an RF switch 410 (hereinafter tenth RF switch 410) coupled to an attenuator 420 and a first load 412 and antenna port 435 includes an RF switch 440 (hereinafter eleventh RF switch 440) coupled to a second load 442 and array element 480.

Tenth and eleventh RF switches 410, 440 of feed port 415 and antenna port 435, respectively, can be configured to change a function of the array element 480 coupled to signal path 402 from a transmit or receive function to an isolation function. In an embodiment, in isolation, the respective array element 480 can be configured as a passive element and thus not perform either transmit or receive functions. Tenth and eleventh RF switches 410, 440 can disconnect a feed portion and/or array element 480 respectively from signal path 402 to effectively isolate feed portion and/or array element 480. Thus, signals received at feed portion and/or array element 480 are provided to first or second load 412, 442 and not provided to signal path 402.

For example, tenth and eleventh RF switches 410, 440 can include multiway switches having a plurality of terminals. In an embodiment, based upon an arrangement of the terminals in tenth and eleventh RF switches 410, 440, a feed portion of unit cell 400 and/or array element 480 can be coupled to signal path 402 or disconnected from signal path 402.

In the illustrative embodiment of FIG. 4, tenth and eleventh RF switches 410, 440 can include three-way switches having three terminals, such as a single pole, two throw (SP2T) switch. A first terminal of tenth RF switch 410 can be coupled to a splitter/combiner circuit (e.g., combiner circuit 168 of FIG. 1) to couple a feed to signal path 402. First terminal of tenth RF switch 410 can receive signals from the splitter/combiner circuit for transmit operations or transmit signals to splitter/combiner circuit for receive operations. First terminal can be switched between a connection to a second terminal or a third terminal to change a function of array element 480. For transmit or receive functions, first terminal can be coupled to second terminal to couple feed port 415 to signal path 402. For isolation functions, first terminal can be coupled to first load 412 to disconnect feed port 415 from signal path 402.

A first terminal of eleventh RF switch 440 can be coupled to phasor 430 to transmit signals to phasor 430 for receive operations or receive signals from phasor 430 for transmit operations. First terminal can be switched between a connection to second terminal or third terminal to change a function of array element 480. For transmit or receive functions, first terminal can be coupled to second terminal to couple antenna port 435 to signal path 402. For isolation functions, first terminal can be coupled to second load 442 to disconnect antenna port 435 from signal path 402.

Thus, a first terminal of each of tenth and eleventh RF switches 410, 440 can be coupled to a load 412, 442 to configure array element 480 as an isolation cell within a sub-array of array elements. In an embodiment, at least one of feed port 415 or antenna port 435 may be coupled to first or second loads 412, 442 to configure array element 480 as an isolation cell. In some embodiments, both feed port 415 and antenna port 442 can be coupled to first and second loads 412, 442 to configure array element 480 as an isolation cell. In some embodiments, the isolation function can be used to increase isolation between array elements configured to transmit functions and array elements configured for receive functions.

Attenuator 420 and phasor 430 can be disposed on the signal path 402 between feed port 415 and antenna port 435 to modify properties of signals being received or transmitted at array element 480. For example, attenuator 420 can be configured to modify or otherwise reduce an amplitude or power of a signal transmitted through signal path 402. Attenuator 420 can include any known attenuator device. In some embodiments, attenuator 420 can include one or more resistive elements. Phasor 430 can be configured to modify phase properties of a signal transmitted through signal path 402. Phasor 430 can include any known phase shift or time-delay devices. In some embodiments, phasor 430 can be used in conjunction with attenuator 420 to modulate a local carrier signal to be transmitted by array element 480.

First and second loads 412, 442 may include terminal connections or terminal load connections (e.g., 50Ω load). Thus, first and second loads 412, 442 may provide an electrical termination and configure array element 480 as an isolation array element. In an embodiment, when a respective array element 480 is coupled to first and second loads 412, 442, the array element can be configured as a passive element.

Figure 4A:
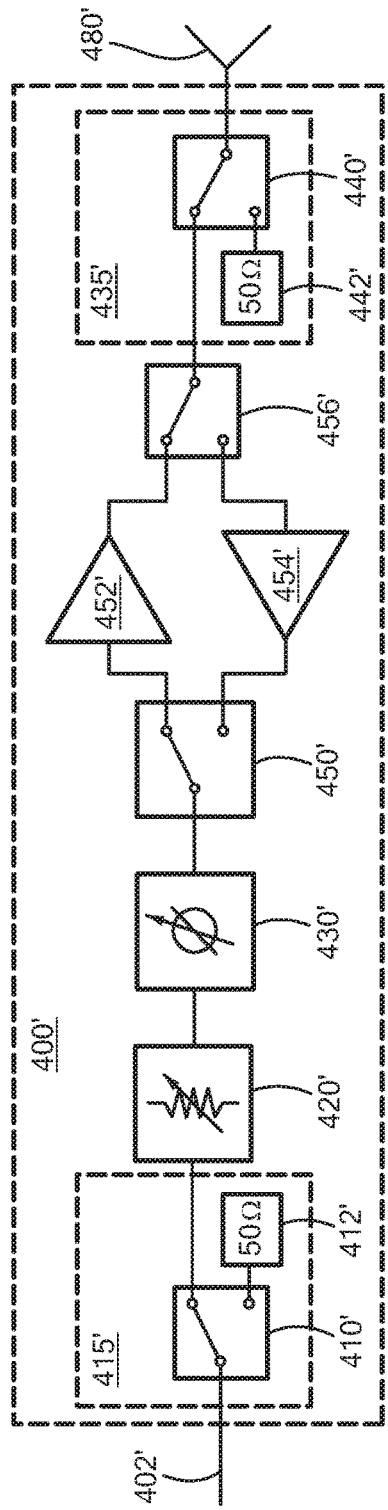
FIG. 4A is a block diagram of a second embodiment of a unit cell of for an array element in the AESA of FIG. 1.
Figure 4B:
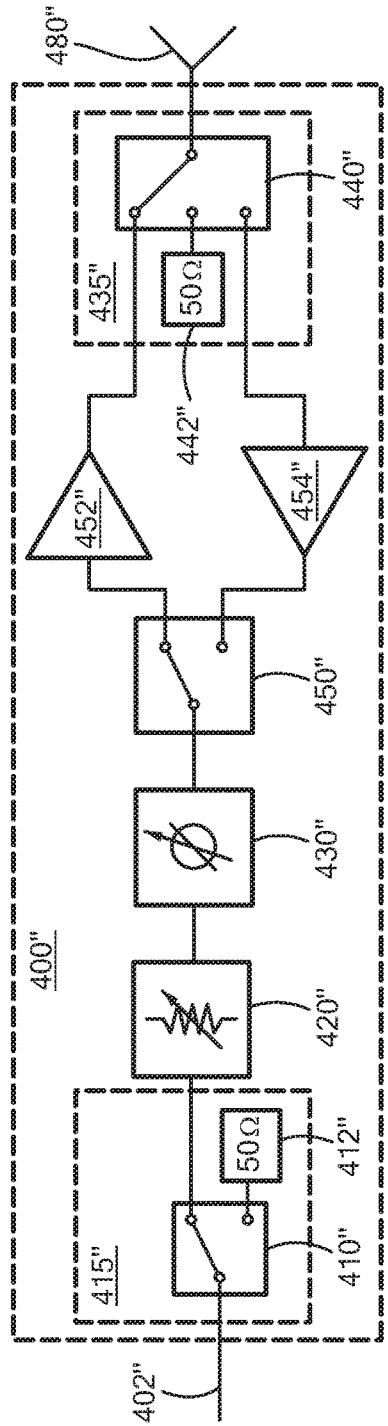
FIG. 4B is a block diagram of a third embodiment of a unit cell of for an array element in the AESA of FIG. 1.

It should be appreciated that unit cell 400 can include transmit and/or receive gain stages and/or one or more RF switches to switch between transmit and receive functions. For example, FIGS. 4A and 4B illustrate different embodiments to implement unit cell 400. For example, FIG. 4A provides a unit cell 400' and FIG. 4B provides a unit cell 400". Each of unit cells 400', 400" can include similar elements to unit cell 400 of FIG. 4. Thus, elements in unit cells 400', 400" having similar numerical reference designations (e.g., antenna ports 415, 415', 415") may be the same or substantially similar and perform the same or similar functions as the related element of unit cell 400 described with respect to FIG. 4.

Now referring to FIG. 4A, an array element 480' is coupled to unit cell 400'. Unit cell 400' includes a signal path 402' having a feed port 415' coupled to an attenuator 420'. Feed port 415' can includes an RF switch 410' having a first terminal coupled to signal path 402', a second terminal coupled to attenuator 420' and a third terminal coupled to load 412'. Attenuator 420' is coupled to a phasor 430', the phasor 430' coupled to a first terminal of RF switch 450'. A second terminal of RF switch 450' can be coupled to an input of first amplifier 452' and a third terminal of RF switch 450' can be coupled to an output of a second amplifier 454'. An output of first amplifier 452' can be coupled to a second terminal of RF switch 456' and an input of second amplifier 454' can be coupled to a third terminal of RF switch 456'. A first terminal of RF switch 456' can be coupled to an antenna port 435' and the antenna port 435' coupled to array element 480'. Antenna port 435 includes an RF switch 440' having a second terminal coupled to the first terminal of RF switch 456', a third terminal to load 442' and a first terminal coupled to array element 480'.

It should be appreciated that array element 480' may be the same as or substantially similar to array elements 180a-180n described above with respect to FIGS. 1-3. Thus, each of array elements 180a-180n may be coupled to or include a unit cell such as unit cell 400' to perform the same functions as will be described below.

Now referring to FIG. 4B, an array element 480" is coupled to unit cell 400'". Unit cell 400" includes a signal path 402" having a feed port 415" coupled to an attenuator 420". Feed port 415" can includes an RF switch 410" having a first terminal coupled to signal path 402", a second terminal coupled to attenuator 420" and a third terminal coupled to load 412". Attenuator 420" is coupled to a phasor 430", the phasor 430" coupled to a first terminal of RF switch 450". A second terminal of RF switch 450" can be coupled to an input of first amplifier 452" and a third terminal of RF switch 450" can be coupled to an output of a second amplifier 454". An output of first amplifier 452" can be coupled to an antenna port 435" and an input of second amplifier 454" can be coupled to antenna port 435". Antenna port 435" includes an RF switch 440" having a second terminal coupled to the output of first amplifier 452", a third terminal coupled to load 442", a fourth terminal coupled to the input of second amplifier 454" and a first terminal coupled to array element 480".

It should be appreciated that array element 480" may be the same as or substantially similar to array elements 180a-180n described above with respect to FIGS. 1-3. Thus, each of array elements 180a-180n may be coupled to or include a unit cell such as unit cell 400" to perform the same functions as will be described below.

Figure 5:
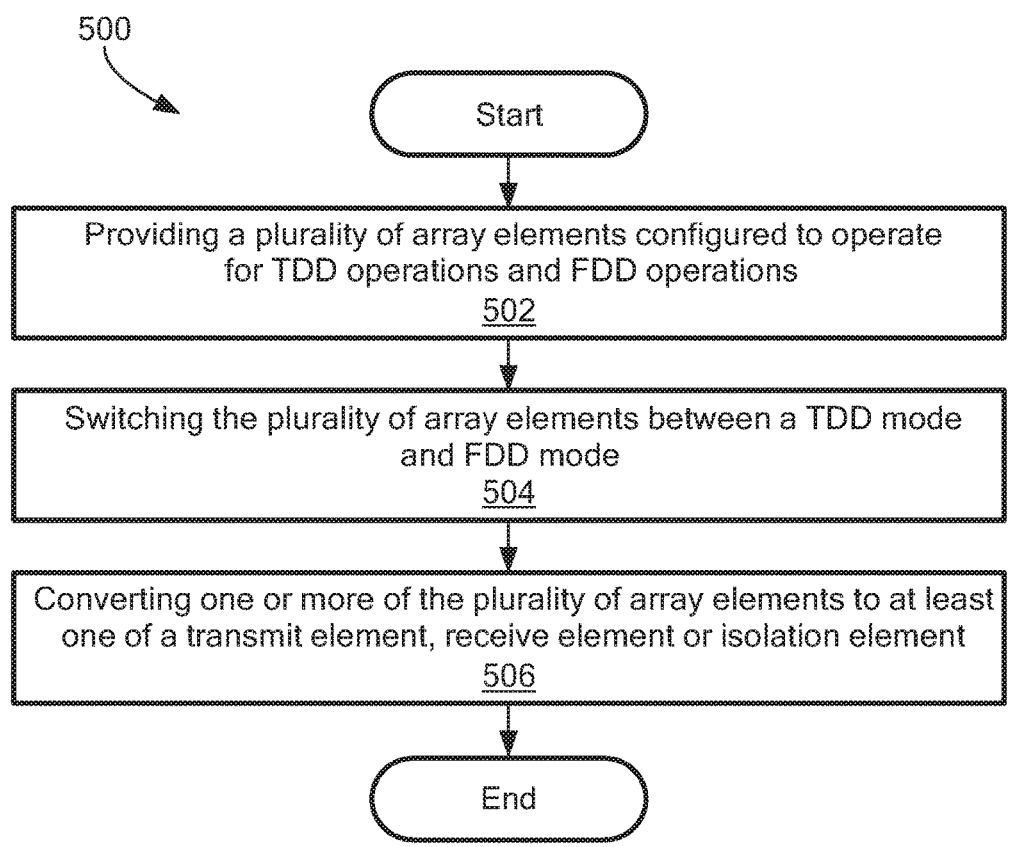
FIG. 5 is a flow diagram of a method for switching an AESA between time division duplexing (TDD) and frequency division duplexing (FDD).

Now referring to FIG. 5, a method 500 for switching an AESA between TDD mode and FDD mode, begins as block 502 by providing a plurality of array elements configured to operate for TDD operations and FDD operations. The AESA can include two or more array elements. The array elements can be organized into two or more subarrays. In some embodiments, a subarray may include multiple array elements. In other embodiments, a subarray may include a single array element.

Each of the array elements can be configured for TDD operations or FDD operations based at least in part on a configuration of switches in a switch network disposed between the array elements and a transceiver of the AESA. The switch network can include one or more switching stages to change a mode of operation of the array elements, swap subarrays from a first function to a second, different function and/or change a function of a specific array element between transmit functions, receive functions or isolation functions. The switch network can include one or more mode-switching stages, a filter switching stage and a crossover switching stage, each disposed on one or more signal paths between the transceiver and the array elements.

In some embodiments, the filter switching stage can be disposed between the first and second mode-switching stages. The first and second mode-switching stages can include one or more RF switches having multiple terminals. Each of the RF switches can be configured to change the couplings between the terminals of the respective RF switches to change a signal path within the AESA.

At block 504, the plurality of array elements can be switched from TDD mode to FDD mode and/or from FDD mode to TDD mode. In an embodiment, terminal couplings in the first and/or second mode-switching stages and filter switching stage can be changed to switch the array elements from TDD mode to FDD mode and/or from FDD mode to TDD mode. For example, the RF switches in the first and second mode-switching stages can have a first coupling arrangement for TDD mode and a second coupling arrangement for FDD mode. Thus, to transition the array elements from TDD mode to FDD mode or vice versa, the coupling arrangements in the RF switches of the first and/or second mode-switching stages can be changed.

The filter switching stage can include an RF switch, a plurality of filter banks and a splitter-combiner circuit. In TDD mode, the RF switch can have a first coupling arrangement for transmit functions and a second coupling arrangement for receive functions. The RF switch can be coupled to at least two RF switches in the first mode-switching stage during TDD mode. The coupling arrangement in the RF switch can be changed to change a function the array elements from transmit functions to receive functions and/or from receive functions to transmit functions during TDD mode.

The RF switch can be coupled to filter bank and the filter bank can be coupled to the splitter-combiner circuit. In TDD mode and during transmit functions, the RF switch can provide signals to the filter bank and the filter bank can provide the signals to the splitter-combiner circuit. In TDD mode and during receive functions, the splitter-combiner circuit can provide signals to the filter bank and the filter bank can provide signals to the RF switch.

In FDD mode, two of the filter banks in the filter switching stage can each be coupled to an RF switch in the first mode-switching stage and an RF switch in the second mode-switching stage. A first filter bank can be disposed on a transmit signal path within AESA and a second filter bank can be disposed on a receive signal path within AESA. Thus, in FDD mode, portions of the array elements can perform transmit functions and portions of the array elements can perform receive functions simultaneously.

At block 506, converting one or more of the plurality of array elements can be converted from to at least one of a transmit element, receive element or isolation element. In the switch network, the second mode-switching stage can be coupled to the crossover switching stage. The crossover switching stage can include multiple RF switches having terminals that are coupled to crisscross signal paths within the AESA.

Each of the RF switches of the crossover switching stage can include multiple coupling arrangements to swap a signal path within the AESA and thus swap portions of the array elements from a first function to a second different function (e.g., transmit function, receive function). For example, in some embodiments, the crossover switching stage may include four RF switches. A first and second RF switch can be coupled to switches in the second mode-switching stage. Each of the first and second RF switches can be coupled to a third and fourth RF switches in the crossover switching stage based on a coupling arrangement within the respective RF switch. The third and fourth RF switches can be coupled to at least one splitter-combiner circuit.

In an embodiment, each of the RF switches in the crossover switching stage can have a first coupling arrangement to configure a first subarray of array elements for a first function and a second subarray of array elements for a second function. Each of the RF switches in the crossover switching stage can have a second coupling arrangement to configure the first subarray of array elements for the second function and the second subarray of array elements for the second function. Thus, to transition subarrays of array elements from the first function to the second function and/or vice versa, the coupling arrangements in the RF switches of the crossover switching stage can be changed.

In some embodiments, the individual array elements can be modified to change a function of the respective array element. For example, each of the array elements can be part of a unit cell or include a unit cell. The unit cell can include a signal path having a feed port coupled to an amplitude unit (e.g., attenuator), the amplitude unit coupled to a phase unit (e.g., phasor), the phase unit coupled to an antenna port and the antenna port coupled to the respective array element. In some embodiments, the unit cell can be configured to change an array element from an active element (e.g., transmit functions, receive functions) to a passive element (e.g., isolation functions) and from a passive element to an active element.

The feed port and antenna port can include components, such as an RF switch and a load unit, to control operation and/or change a function of the respective array element between transmit functions, receive functions or isolation functions. The RF switch in the feed port can have a first coupling arrangement to couple the feed port to the signal path within the unit cell and a second coupling arrangement to couple the feed port to the load unit and thus disconnect the feed port from the signal path. The RF switch in the antenna port can have a first coupling arrangement to couple the antenna port to the signal path within the unit cell and a second coupling arrangement to couple the antenna port to a load unit and thus disconnect the antenna port from the signal path.

In some embodiments, both an RF switch in the feed port and antenna port can be coupled to the load unit to convert the respective array element from an active element to a passive element. In other embodiments, an RF switch in either the feed port or antenna port can be coupled to the load unit to convert the respective array element from an active element to a passive element.

Both, an RF switch in the feed port and antenna port can be coupled to the signal path to convert the respective array element from a passive element to an active element. It should be appreciated that in some embodiments, when an array element is converted to a passive element it can perform isolation functions and thus be referred to herein as an isolation array element. For example, isolation array elements may be used to provide isolation between transmit array elements and receive element in the AESA.

In some embodiments, amplitude and/or phase properties of signals received at or to be transmitted by a respective array element can be modified. For example, the RF switch in the feed port and antenna port can be coupled to the signal path and signals can pass between the transceiver and a respective array element. The signal path can include an amplitude unit, a phase unit or both. The amplitude unit can be configured to adjust amplitude characteristics of signals, for example, to perform amplitude tapering. The phase unit can be configured to adjust phase characteristics, for example, for beam steering.

For transmit functions, signals can be generated by a transceiver, passed though the switch network of the AESA and provided to the feed port. The feed port can provide the signals to the amplitude unit. The amplitude unit can modify (e.g., increase, decrease) amplitude characteristics of the signals and provide the amplitude modified signals to the phase unit. The phase unit can modify (e.g., increase, decrease) phase properties of the signals and provide the signals to the antenna port. The antenna port can provide the signals to the respective array element to be transmitted.

For receive functions, signals received at the array element can be provided to the signal path by the antenna port. The phase unit on the signal path can be configured to modify phase characteristics of the respective signals and provide the signals to the amplitude unit. The amplitude unit can modify amplitude characteristics of the signals and provide the amplitude modified signals to the feed port. The feed port can provide the signals to components of the switch network to transmit the signals to the transceiver.

In some embodiments, the signal path may include only an amplitude unit or a phase unit. In other embodiments, the signal path may include other units or elements for modifying properties of the signals, for example, but not limited to an amplifier unit.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed:

1. An active electronically scanned array (AESA) comprising:
   a plurality of array elements, each of the plurality of array elements configured for time division duplexing (TDD) operations and frequency division duplexing (FDD) operations; and
   a switch network coupled to the plurality of array elements, the switch network having a plurality of stages to switch at least one or more of the plurality of array elements between a TDD mode and a FDD mode, wherein the switch network comprises a first and second mode-switching stage and further comprises a crossover switching stage disposed on a signal path between the array elements and at least one of the first and second mode-switching stages, wherein the crossover switching stage is configured to swap a portion of the plurality of array elements from one function to another function,
   wherein a first portion of the plurality of array elements is configured to operate as transmit elements, a second portion of the plurality of array elements is configured to operate as receive elements, and a third portion of the plurality of array elements is configured to operate as isolation elements in the FDD mode, wherein the third portion is between the first portion and the second portion.

2. The array of claim 1, wherein the switch network further comprises a filter bank switching stage disposed on a signal path between the first mode-switching stage and the second mode-switching stage.

3. The array of claim 1, further comprising each of the plurality of array elements configured to operate as at least one of a transmit element, a receive element or an isolation element.

4. The array of claim 1, further comprising each of the plurality of array elements configured to operate as transmit and receive elements in the TDD mode.

5. The array of claim 1, wherein the first and second mode-switching stages include one or more radio frequency (RF) switches disposed on at least two signal paths through the AESA.

6. The array of claim 5, wherein the filter bank switching stage comprises a FDD transmit filter bank, a FDD receive filter bank and a TDD filter bank coupled to the one or more RF switches in the first and second mode-switching stages.

7. The array of claim 1, wherein the crossover switching stage includes two or more radio frequency (RF) switches arranged such that two signal paths through the AESA crisscross.

8. The array of claim 1, further comprising each of the plurality of array elements having a feed port, an antenna port, an amplitude unit, a phase unit, and one or more load units.

9. The array of claim 8, further comprising the feed port and the antenna port coupled to the one or more load units to convert the respective array element into an isolation element.

10. In an active electronically scanned array (AESA) having a plurality of array elements, each of the plurality of array elements configured for time division duplexing (TDD) operations and frequency division duplexing (FDD) operations, a method for switching between a time division duplexing (TDD) mode and a frequency division duplexing (FDD) mode, the method comprising:

switching at least one of the plurality of array elements between a TDD mode and a FDD mode;

converting one or more of the plurality of array elements to at least one of a transmit element, a receive element or an isolation element responsive to switching to the TDD mode or FDD mode, such that a first portion of the plurality of array elements is configured to operate as transmit elements, a second portion of the plurality of array elements is configured to operate as receive elements, and a third portion of the plurality of array elements is configured to operate as isolation elements in the FDD mode, wherein the third portion is between the first portion and the second portion; and swapping a portion of the plurality of array elements from one function to another function via a crossover switching stage of a switch network having a plurality of stages to switch the plurality of array elements between the TDD mode and the FDD mode, wherein the switch network comprises a first and second mode-switching stage, a crossover switching stage, and a filter bank switching stage.

11. The method of claim 10, further comprising converting each of the plurality of array elements configured to operate as transmit and receive elements in the TDD mode.

12. The method of claim 10, further comprising modifying couplings within the first and second mode-switching stages to the change the plurality of array elements from TDD operations to FDD operations and from FDD operations to TDD operations.

13. The method of claim 10, further comprising modifying couplings within the crossover switching stage to convert a first grouping of the plurality of array elements from transmit elements to receive elements and convert a second grouping of the plurality of array elements from receive elements to transmit elements.

14. The method of claim 10, further comprising each of the plurality of array elements comprises a feed port, an antenna port, an amplitude unit, a phase unit, and one or more load units.

15. The method of claim 14, further comprising coupling the feed port and the antenna port to the one or more load units to convert the respective array element into the isolation element.

16. An active electronically scanned array (AESA) comprising:

a plurality of array elements, each of the plurality of array elements configured for time division duplexing (TDD) operations and frequency division duplexing (FDD) operations; and a switch network coupled to the plurality of array elements, the switch network having a plurality of stages to switch at least one or more of the plurality of array elements between a TDD mode and a FDD mode, wherein a first portion of the plurality of array elements is configured to operate as transmit elements, a second portion of the plurality of array elements is configured to operate as receive elements, and a third portion of the plurality of array elements is configured to operate as isolation elements in the FDD mode, wherein the third portion is between the first portion and the second portion;

wherein the switch network further comprises a crossover switching stage configured to swap a portion of the plurality of array elements from one function to another function.

\* \* \* \* \*